United States Patent
Blue

(10) Patent No.: US 9,328,625 B2
(45) Date of Patent: *May 3, 2016

(54) RAM BEARING ASSEMBLY, SEAL ASSEMBLY THEREFOR AND ASSOCIATED METHOD

(71) Applicant: Stolle Machinery Company, LLC, Centennial, CO (US)

(72) Inventor: Rodney Adolph Blue, Huntington Beach, CA (US)

(73) Assignee: Stolle Machinery Company, LLC, Centennial, CO (US)

( * ) Notice: Subject to any disclaimer, the term of this patent is extended or adjusted under 35 U.S.C. 154(b) by 381 days.

This patent is subject to a terminal disclaimer.

(21) Appl. No.: 13/903,178

(22) Filed: May 28, 2013

(65) Prior Publication Data
US 2013/0255481 A1    Oct. 3, 2013

Related U.S. Application Data

(63) Continuation of application No. 12/708,794, filed on Feb. 19, 2010, now Pat. No. 8,453,558.

(60) Provisional application No. 61/153,670, filed on Feb. 19, 2009.

(51) Int. Cl.
*F01D 25/00* (2006.01)
*F16J 15/18* (2006.01)

(52) U.S. Cl.
CPC ............... *F01D 25/00* (2013.01); *F16J 15/187* (2013.01)

(58) Field of Classification Search
CPC .................... F16J 15/184; F16J 15/189
USPC .................. 92/165 R; 277/510, 511, 526
See application file for complete search history.

(56) References Cited

U.S. PATENT DOCUMENTS

| | | | | |
|---|---|---|---|---|
| 3,663,076 | A * | 5/1972 | Valente | 384/130 |
| 4,398,731 | A * | 8/1983 | Gorman et al. | 277/529 |
| 4,576,385 | A * | 3/1986 | Ungchusri et al. | 277/562 |
| 4,592,558 | A * | 6/1986 | Hopkins | 277/572 |
| 5,295,549 | A * | 3/1994 | Dolezal et al. | 175/371 |
| 6,007,070 | A * | 12/1999 | Heathcott et al. | 277/510 |
| 9,027,906 | B2 * | 5/2015 | Kung | 251/214 |
| 2003/0214100 | A1 * | 11/2003 | Pippert | 277/510 |
| 2006/0097457 | A1 * | 5/2006 | Flaherty | F16J 15/3272 277/543 |
| 2008/0098884 | A1 * | 5/2008 | Varanasi et al. | 92/165 R |

OTHER PUBLICATIONS

PCT Written Opinion for PCT/US10/24719, dated Apr. 21, 2010.

* cited by examiner

*Primary Examiner* — Thomas E Lazo
(74) *Attorney, Agent, or Firm* — Eckert Seamans Cherin & Mellott, LLC; David C. Jenkins

(57) ABSTRACT

As seal assembly for a ram assembly is provided. An elongated ram extends through the seal assembly. The seal assembly includes a housing body, a plurality of seals and a retaining, and compression, device. The seals, as well as a male energizer and a female energizer, each have a split body. In this configuration, the seals and energizers may be replaced without removing the seal assembly housing body and retaining device from about the ram. This further allows for the ram to remain in place during seal replacement. That is, the split seals may be separated an placed about the ram. Once in place, the ends of the split seal are joined at an interface. The retaining/compression device compresses the seals so that the interface is sealed.

18 Claims, 13 Drawing Sheets

RAM BEARING ASSEMBLY, SEAL ASSEMBLY THEREFOR AND ASSOCIATED METHOD

CROSS REFERENCE TO RELATED APPLICATION

This application is a continuation of U.S. Ser. No. 12/708,794, filed Feb. 19, 2010, entitled RAM BEARING ASSEMBLY, SEAL ASSEMBLY THEREFOR AND ASSOCIATED METHOD, which application claims priority from U.S. Provisional Application Ser. No. 61/153,670, filed Feb. 19, 2009, entitled RAM BEARING ASSEMBLY, SEAL ASSEMBLY THEREFOR AND ASSOCIATED METHOD.

BACKGROUND OF THE INVENTION

1. Field of the Invention

The disclosed concept relates generally to machines and methods for making containers, such as cans and, more particularly, to ram bearing assemblies for can-making machines. The disclosed concept also relates to seal assemblies for ram bearing assemblies.

2. Background Information

Machines for making cans typically include a ram assembly, which is actuated to manipulate (e.g., form) metal into a desired shape (e.g., without limitation, the cylindrical body of a can).

Typically, a bearing assembly is employed to facilitate movement of the ram, and a suitable lubricant, such as oil, is used to lubricate the bearing assembly. A coolant may also be employed to maintain the desired temperature of the assembly. A seal assembly including a number of seals is employed to maintain the oil in one desired location and/or the coolant in another desired location. For example, the oil may be disposed on one side of the seal assembly and the coolant may be disposed on the opposite side of the assembly. Oil and/or coolant can sometimes undesirably escape past the seals, for example, due to the seals becoming worn through use over time. Additionally, when seals become worn they must be replaced. Traditionally, such replacement has required removal of several major components (e.g., without limitation, ram; slide yoke; secondary connecting rod) of the ram assembly. Among other disadvantages, this disassembly and reassembly undesirably results in excessive machine downtime (e.g., up to two hours or more), and the potential for errors during reassembly, which could result in component failure.

Additionally, the seal assemblies of conventional ram bearings are not adjustable and, therefore, do not provide any mechanism for extending the life of seals. For example, FIGS. 1 and 2A-2C show a conventional ram bearing assembly and seal assembly therefore. As shown, the seal retainer and bearing housing are fixedly coupled together by fasteners to secure the seals. No mechanism for adjusting the assembly is provided. It is noted that in the figures, the ram is shown only in part. That is, the ram actually extends further to the left as shown in FIGS. 2A and 2B.

There is, therefore, room for improvement in ram bearing assemblies, and in seal assemblies and associated methods therefore.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
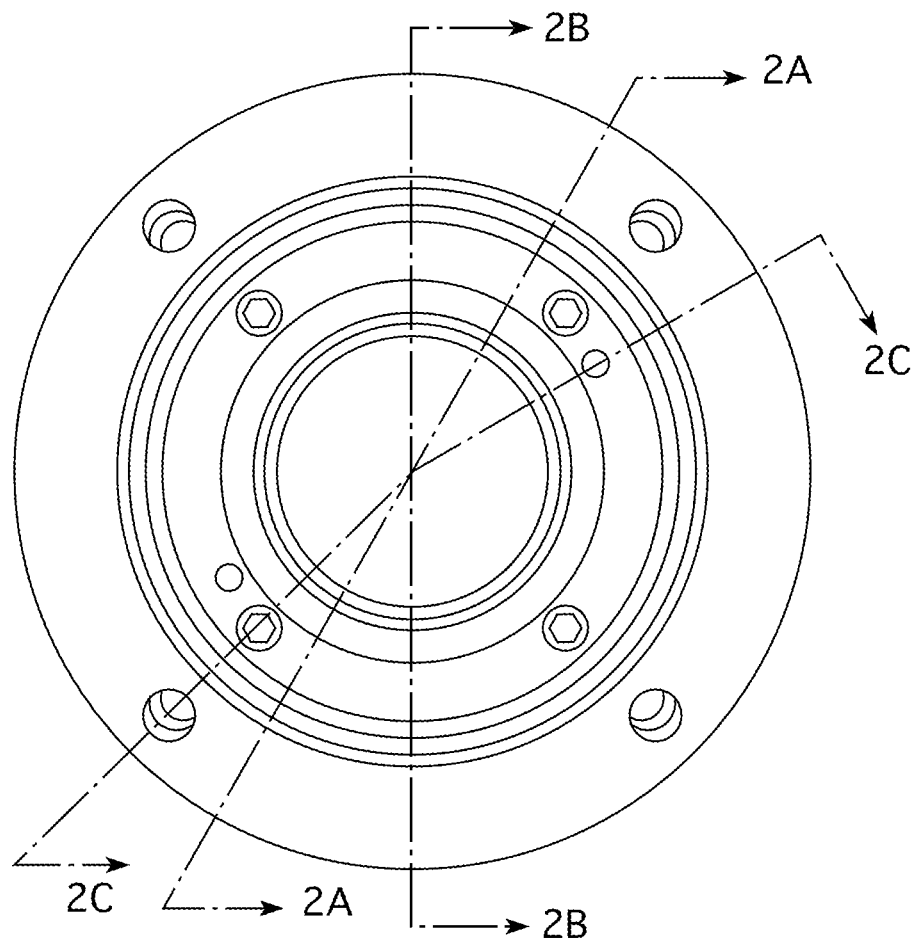
FIG. 1 is an end elevation view of a prior art ram bearing assembly and seal assembly therefore.

Directional phrases used herein, such as, for example, left, right, up, down, top, bottom, front, back, clockwise, counter-clockwise and derivatives thereof, relate to the orientation of the elements shown in the drawings and are not limiting upon the claims unless expressly recited therein.

The specific elements illustrated in the drawings and described herein are simply exemplary embodiments of the disclosed concept. Accordingly, specific dimensions, orientations, materials and other physical characteristics related to the embodiments disclosed herein are not to be considered limiting on the scope of the disclosed concept.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As used herein, "directly coupled" means that two elements are directly in contact with each other.

As used herein, "fixedly coupled" or "fixed" means that two components are coupled so as to move as one while maintaining a constant orientation relative to each other.

As used herein, "nested" means an assemblage of adjacent elements having a similar shape, and/or cross-sectional shape, and wherein the elements fit within each other. Colloquially, this concept is identified as "spooning."

As used herein, a "loop" encloses an area and is not limited to a circular and/or an oval shape. For example, a square seal extending about a square shaft forms a "loop."

As used herein, a "vertex" is the area where two generally straight lines, or a generally equivalent construct, meet.

Figure 3:
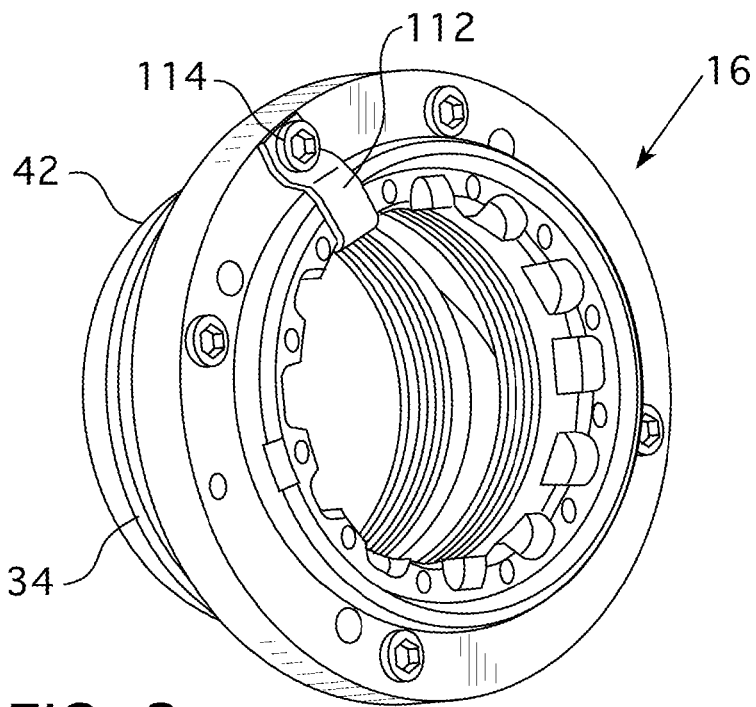
FIG. 3 is an isometric view of a seal assembly for a ram bearing assembly in accordance with an embodiment of the disclosed concept.
Figure 4:
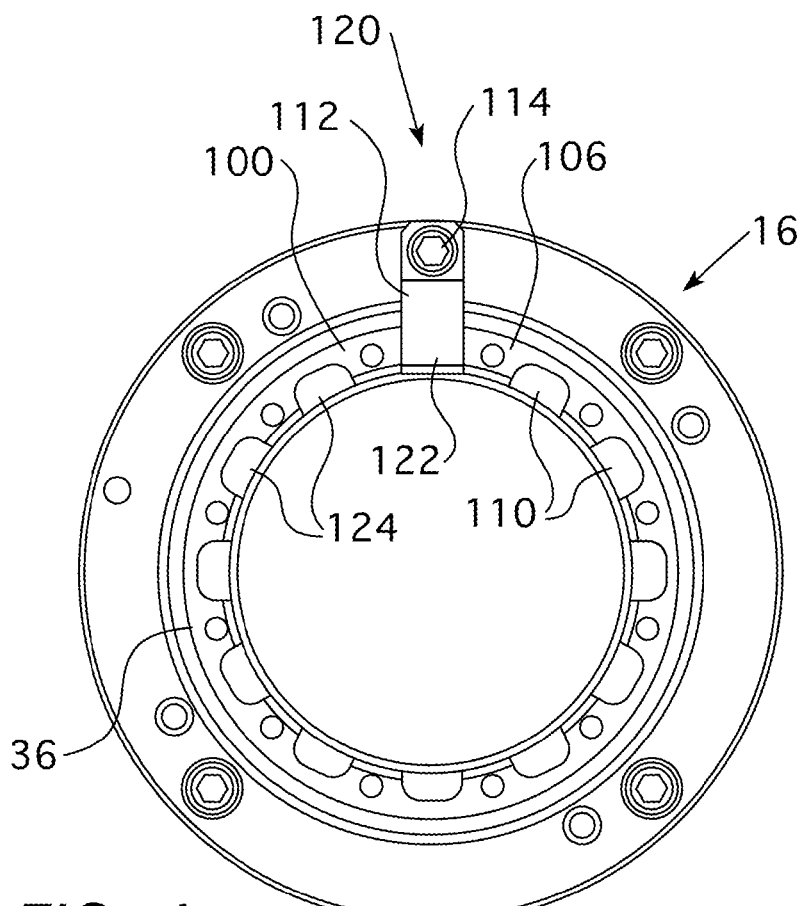
FIGS. 4 and 5 are end elevation and section views, respectively, of the ram bearing assembly and seal assembly therefore of FIG. 3.
Figure 5:
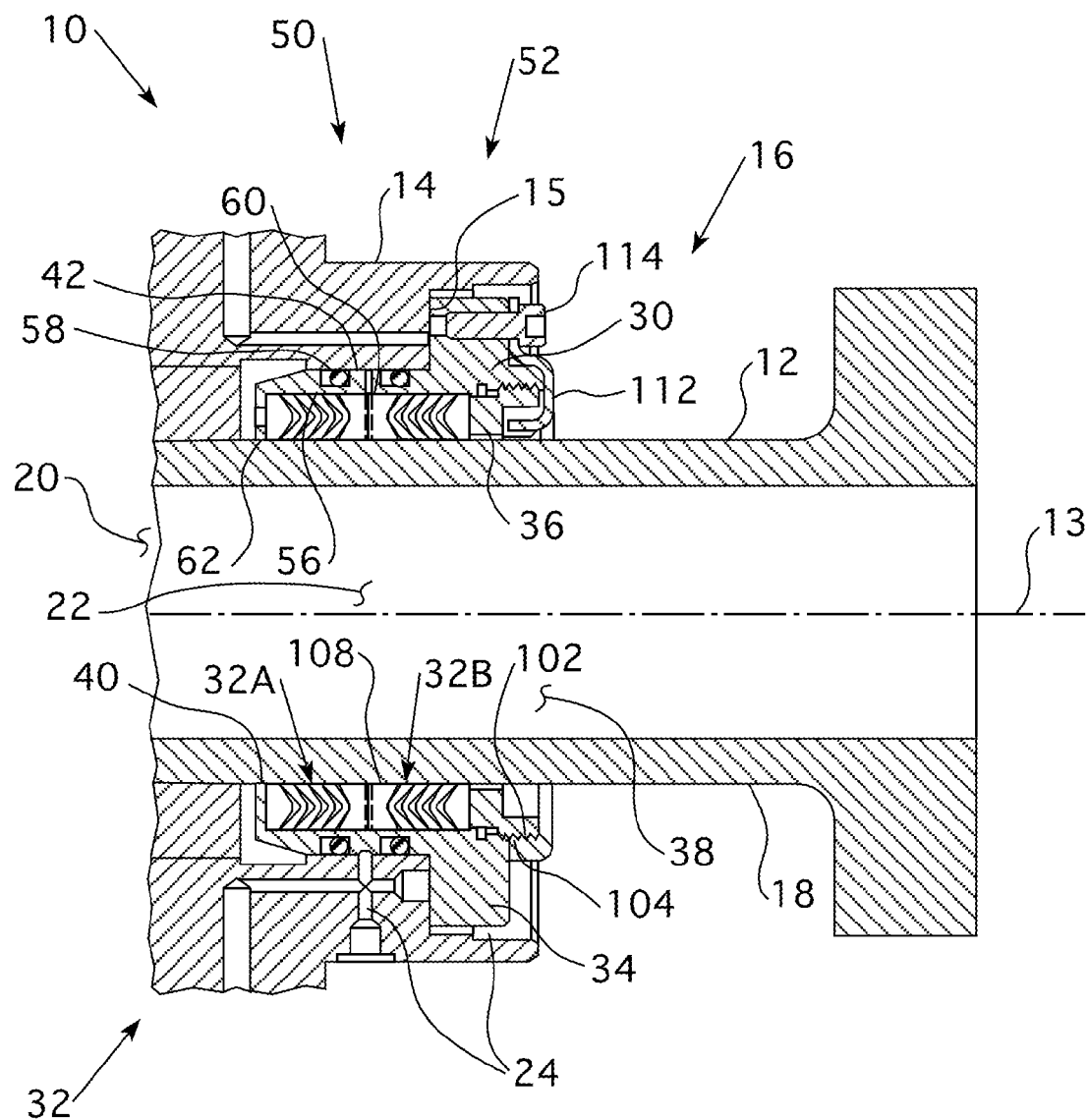

FIGS. 3-5 show a ram bearing assembly including a seal assembly (e.g., without limitation, rear seal pack assembly; V-packing assembly), for sealing coolant from migrating from left to right (from the perspective of FIG. 5) and oil from migrating right to left (from the perspective of FIG. 5). In other words, there are preferably two V-packing assemblies, which are preferably oriented as shown in the non-limiting example of FIGS. 6 and 7. At least some of the individual components of the seal assembly are split at one location on their circumference, as shown for example and without limitation in FIGS. 6-14, to allow assembly over the ram without requiring ram removal.

With the ram retracted (e.g., moved to right from the perspective of FIG. 5) and components disassembled, as shown for example in FIGS. 6 and 7, the assembly procedure is as follows:

Install the V-packing assemblies on the ram to the right side of the inner seal housing;

Slide the V-packing assemblies axially into the cavity of such housing;

Install the locknut until the desired preload force is applied to the seals; and Install the retaining clip with fasteners to retain lock nut in the desired preload position.

It will, therefore, be appreciated that the lock nut is adjustable so that it can be repositioned to further energize the seal, thereby compensating for wear. In this manner, the life of the seal(s) is/are substantially extended.

It will be appreciated, however, that the examples provided herein are for purposes of illustration only and are not meant to be limiting upon the scope of the disclosed concept. For example, seals of any known or suitable alternative type, number (not shown), shape (not shown), and/or configuration (not shown), other than that which has been shown and described herein, could be employed without departing from the scope of the disclosed concept.

Accordingly, a seal assembly is provided that does not require removal of any of the major components of the ram assembly. Consequently, whereas replacement of the seals has traditionally taken up to two hours or more, the disclosed concept enables replacement to be completed in a substantially shorter period of time (e.g., without limitation, as little as 15 minutes or less). Additionally, the disclosed seal assembly provides extended seal life and improved resistance to undesirable oil loss.

More specifically, a seal assembly 16 is shown in FIGS. 3-5 and portion of a ram assembly 10 is shown in FIG. 5. The ram assembly 10 includes a ram 12, a ram housing 14, and a seal assembly 16. The ram 12 is, typically, an elongated tubular body 18 that is, preferably, hollow. The longitudinal axis of the ram 12 defines a primary axis 13. The outer surface of the ram 12 is substantially smooth. Preferably, the ram 12 has a generally circular cross-sectional shape, however, rams (not shown) having different cross-sectional shapes are known and may be used with the disclosed and claimed concept. That is, the ram 12 typically has a circular cross-section. As such, the following description may discuss the "radius" or "diameter" of the ram 12, or other aspects indicating a circular ram 12. The invention, however, is not so limited and it is understood that the ram 12 may have a cross-section of any shape. It is further understood that words such as, but not limited to, "diameter" would correspond to a "width" or similar measurement on a ram 12 having a non-circular cross-section.

The ram assembly housing 14 includes an elongated passage 20 through which the ram 12 extends. The ram assembly housing passage 20 generally conforms to the shape of the ram 12 and is just slightly larger than the ram 12 thereby allowing the ram 12 to move within the ram assembly housing passage 20 while not having a significant gap between the ram 12 and the ram assembly housing passage 20. The ram 12 is structured to move between a first position and a second position. The ram 12 moves generally horizontally from the perspective shown in FIG. 5.

The ram assembly housing passage 20 includes an entrance 22 through which the ram 12 extends. The ram assembly housing passage entrance 22 has a larger cross-sectional area than the ram assembly housing passage 20. The surface of the ram assembly housing passage 20 is substantially smooth at the ram assembly housing passage entrance 22. Further, as is known, the ram housing 14 extending about the passage entrance 22 may include a network of internal passageways 24 that extend about the ram assembly housing passage 20 having an opening both on the outer surface of the ram assembly housing 14 and on the inner surface of the ram assembly housing passage 20. As is known, the internal passageways 24 are, typically, relatively small compared to the ram assembly housing passage 20 and are, typically, used to pass a purging gas to the seal assembly 16. The seal assembly 16 is disposed at the ram assembly housing entrance 22 to the ram assembly housing passage 20.

Generally, the outer surface of the ram 12 is exposed to a coolant outside of the ram assembly housing 14 (to the right in FIG. 5) and to a lubricant inside the ram housing 14. The seal assembly 16 is structured to substantially resist migration of the coolant to inside the ram assembly housing 14 and substantially resist migration of the lubricant to outside the ram assembly housing 14. The seal assembly 16 includes a housing 30 and at least one seal pack 32. The seal assembly housing 30 includes a body 34 and a retaining device 36. The seal assembly housing body 34 defines a seal assembly passage 38. The seal assembly body 34 has an inner surface 40 and an outer surface 42 wherein the seal assembly inner surface 40 generally defines the seal assembly passage 38. The seal assembly housing 30 includes a narrow portion 50 and a flange 52. The seal assembly housing narrow portion 50 is sized to fit within the ram assembly housing passage entrance 22. The seal assembly body outer surface 42 at the body narrow portion 50 preferably includes at least one, and more preferably two, O-ring grooves 56. An O-ring 58 is disposed in each seal assembly body O-ring groove 56. When the seal assembly 16 is disposed within the ram assembly housing passage entrance 22, the seal assembly O-rings 58 sealingly engage the inner surface of the ram assembly housing passage 20. The seal assembly passage 38 has the same general shape and dimensions as the ram assembly housing passage 20. Thus, when the seal assembly 16 is assembled and installed, as discussed below, the seal assembly passage 38 is, essentially, an extension of the ram assembly housing passage 20. That is, the seal assembly passage 38 and the ram assembly housing passage 20 are generally contiguous.

Figure 2A:
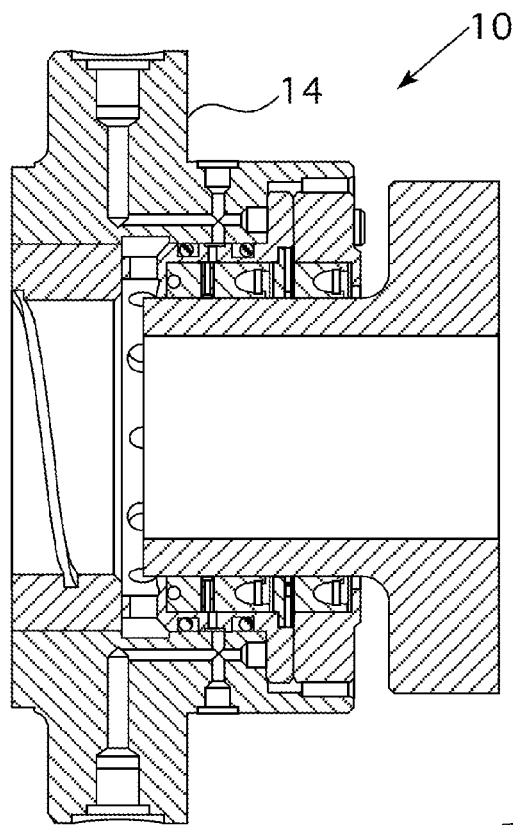
FIGS. 2A-2C are sectional views taken along lines A-A, B-B and C-C, respectively, of FIG. 1.
Figure 2B:
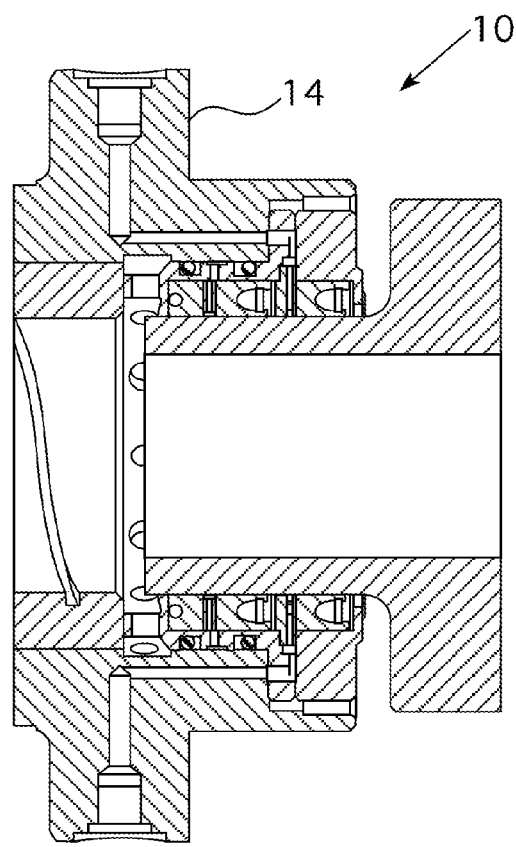
Figure 2C:
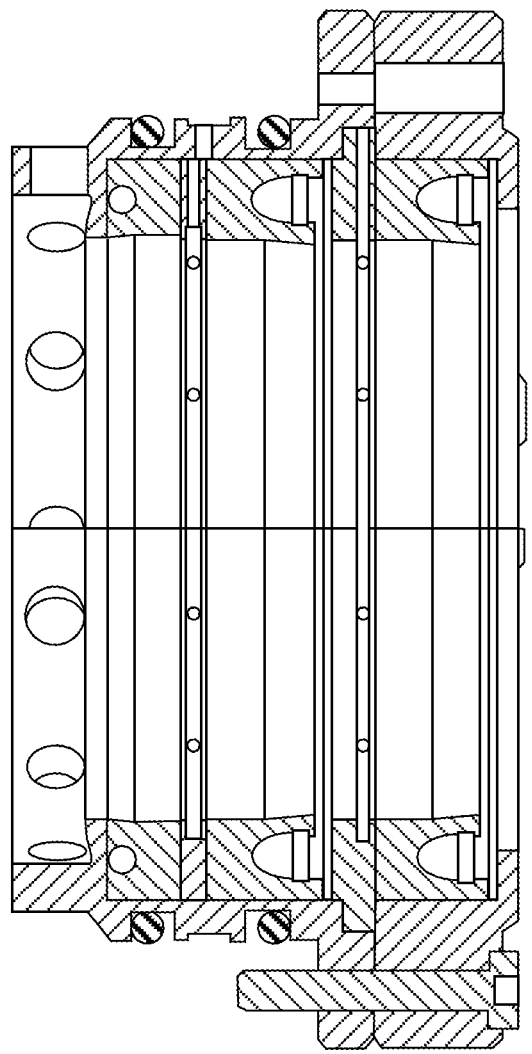

The seal assembly body flange 52 has a cross-sectional area, and in the preferred embodiment has a generally circular cross-section, a diameter, that is larger than the cross-sectional area, or diameter, of the ram assembly housing passage 20. The seal assembly body flange 52 extends generally perpendicular to the primary axis 13. Preferably, the ram assembly housing 14 has an axial face 15 at the ram assembly housing passage entrance 22. The ram assembly housing axial face 15 also extends generally perpendicular to the primary axis 13. Thus, the ram assembly housing axial face 15 provides a coupling surface for the seal assembly body flange 52. That is, as shown in FIG. 2A, the seal assembly body flange 52 may engage the ram assembly housing axial face 15 and elongated fasteners extending parallel to the primary axis 13 may be passed through the seal assembly body flange 52 into the ram assembly housing axial face 15 thereby coupling the seal assembly 16 to the ram assembly housing 14.

The seal assembly body inner surface 40 includes a radial recess 60. The recess is structured to accommodate the at least one seal pack 32. The recess 60 is open on the axial face 15 adjacent to the seal assembly body flange 52. The recess 60 is closed on the axial face 15 distal to the seal assembly body flange 52. That is, the recess 60 includes a seal support flange 62. The distal end of the seal support flange 62 is sized to generally conform to the shape of the ram 12 and is just slightly larger than the ram 12 similar to the ram assembly housing passage 20 discussed above.

Figure 6:
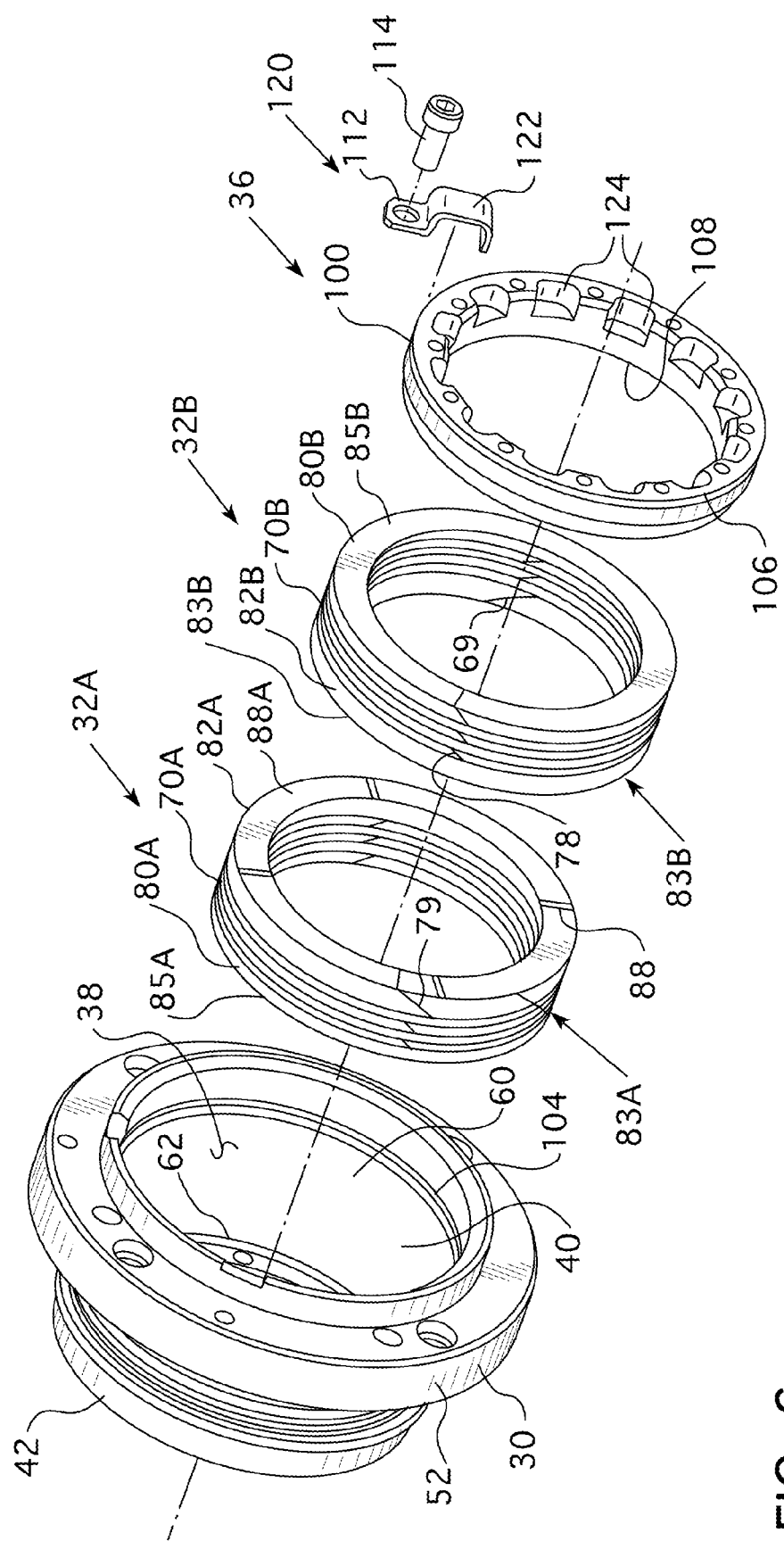
FIGS. 6 and 7 are partially exploded isometric views of the seal assembly of FIG. 3.
Figure 7:
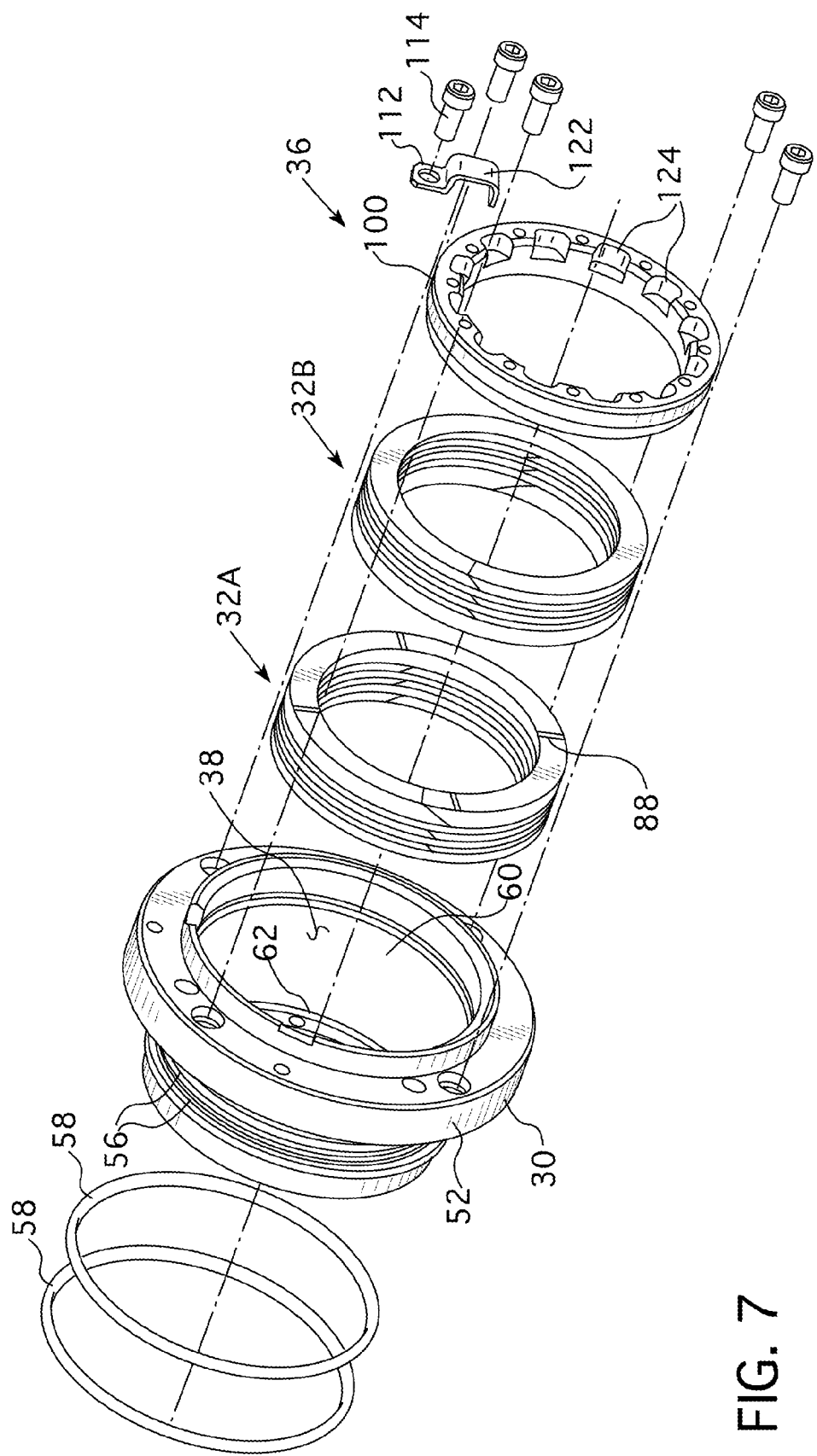
Figure 8A:
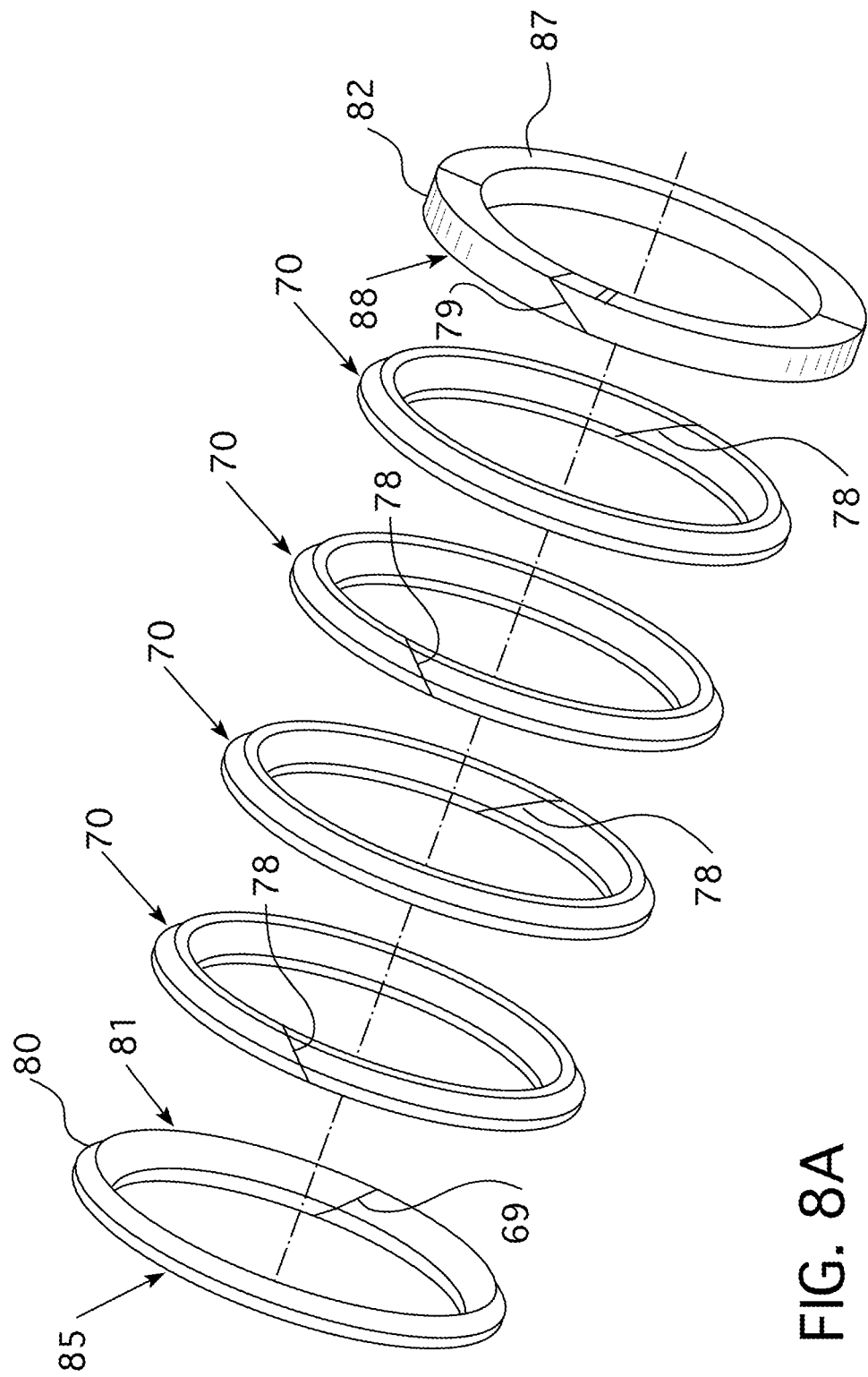
FIGS. 8A and 8B are isometric exploded and assembled views, respectively, of the V-packing assemblies of FIG. 7.
Figure 8B:
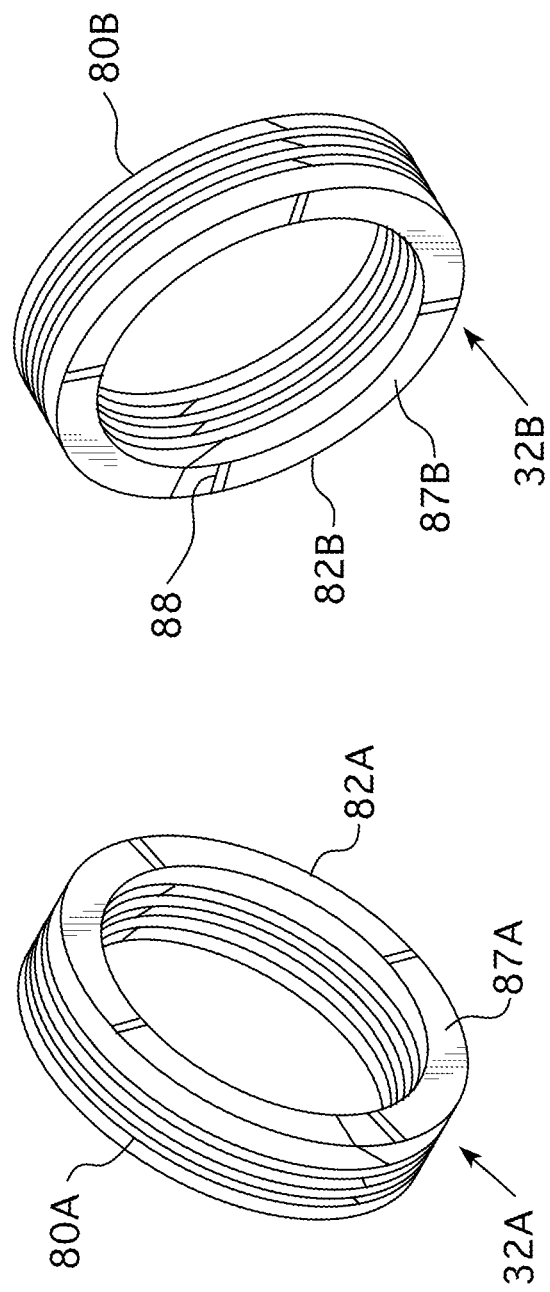
Figure 9:
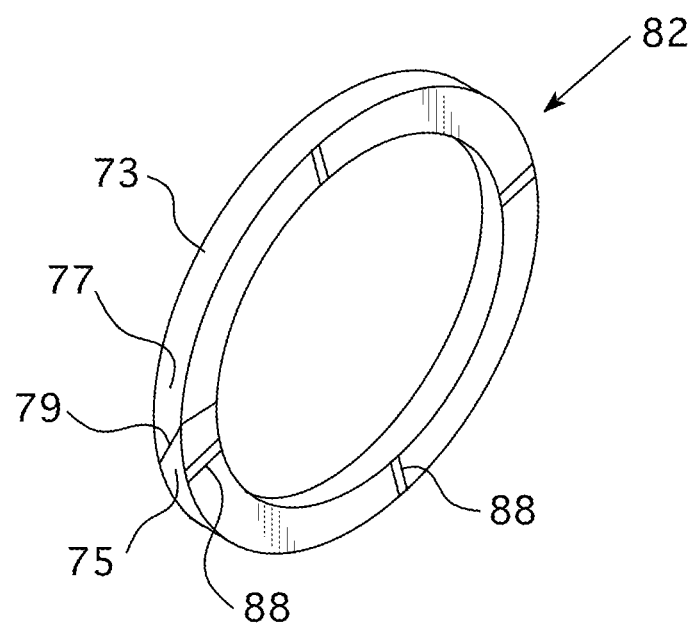
FIGS. 9-10 are isometric and cross-sectional views, respectively, of the split female energizer.
Figure 10:
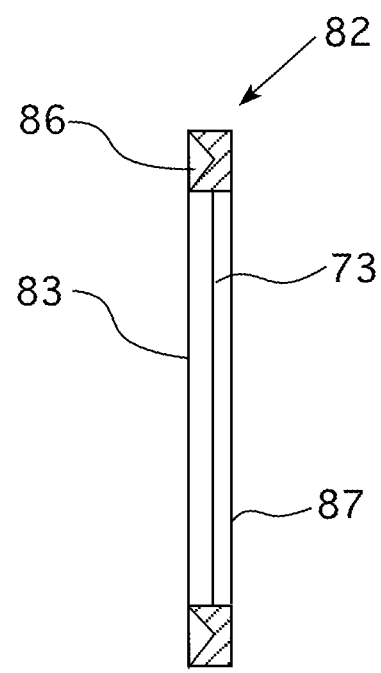
Figure 11:
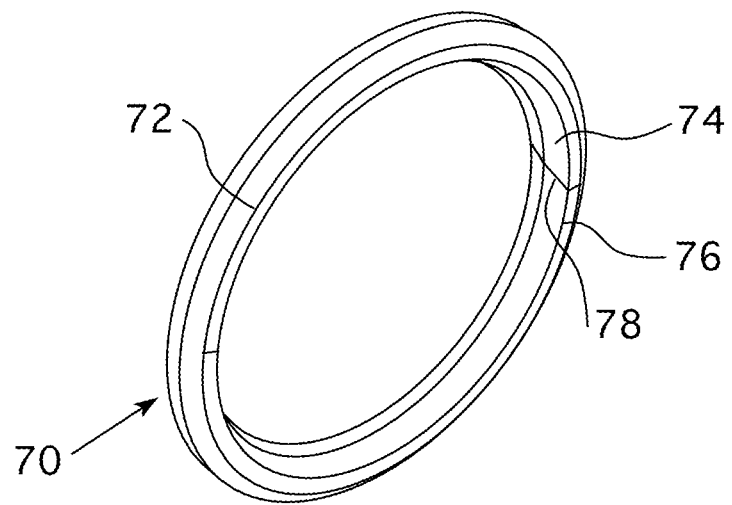
FIGS. 11-12 are isometric and cross-sectional views, respectively, of a split seal having a V-shaped cross-section.
Figure 12:
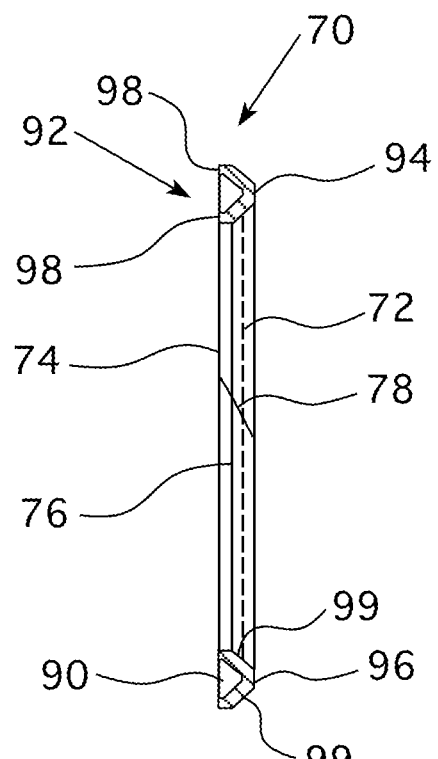
Figure 13:
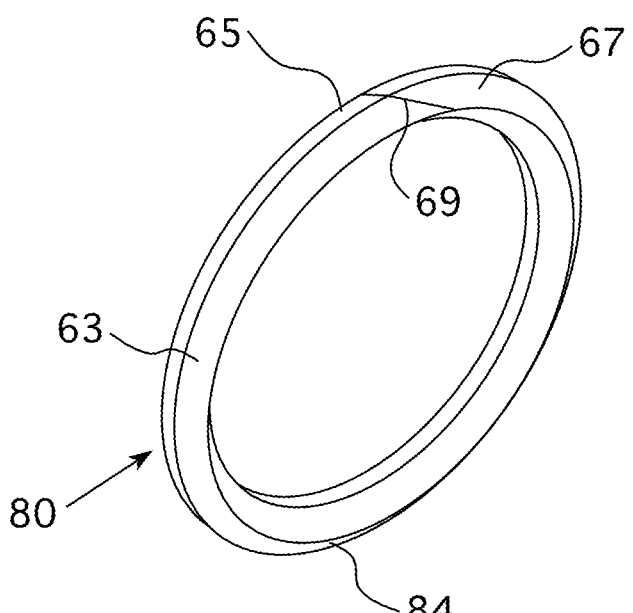
FIGS. 13-14 are isometric and cross-sectional views, respectively, of the split male energizer.
Figure 14:
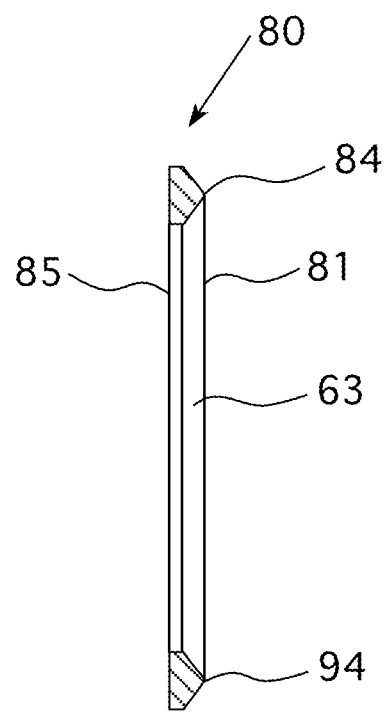

As shown in FIGS. 6-8, the at least one seal pack 32 includes at least one split seal 70 and, preferably includes a split male energizer 80 and a split female energizer 82. A split seal 70, as well as the split male energizer 80 and the split female energizer 82, is shaped as a broken loop corresponding to the cross-sectional shape of the ram 12. As shown in FIGS. 11-12, each split seal 70 has a loop-shaped body 72 with a first end 74 and a second end 76. The split seal body first end 74 and second end 76 are structured to sealingly engage each other at an interface 78. The "split," or "break," in the split seal 70 allows the seal to be installed about the ram 12 while the ram 12 is in place, i.e. while the ram 12 is partially, or substantially, disposed within the ram assembly housing passage 20. That is, during installation of the split seal 70, the split seal body first end 74 and second end 76 are separated creating a gap and thereby allowing the split seal body 72 to be placed about the ram 12. The split male energizer 80 (FIGS. 12-13) and the split female energizer 82 (FIGS. 9-10) are installed in a similar manner. That is, each energizer 80, 82 also has a split body 63 (male) (best shown in FIG. 14), 73 (female) (best shown in FIG. 9) with a first and second end 65, 67, (male) 75, 77 (female) that sealingly engage each other at an interface 69 (male), 79 (female). It is noted that one or more of the at least one split seal 70 split male energizer 80 and a split female energizer 82 may include a radial air passages 88 (FIGS. 8B, 9) structured to operate with an air purge system (not shown). The air passage 88 extends from the outer radius to the inner radius of the body on which it is located.

Each interface 69, 78, 79 (all shown in FIG. 8A) is, preferably, beveled, or more specifically, the split seal body first end 74 and second end 76 (and the energizer first and second ends 65, 67, (male) 75, 77 (female)) are beveled. That is, each interface 69, 78, 79 is generally planar wherein the plane is a radial plane, i.e. the plane crosses the primary axis 13 with at least one line in the plane normal to the primary axis 13, but wherein the plane extends at an angle relative to the primary axis 13. To enhance the sealing quality of the interface 78 it is preferable that a radial break in the split seal body 72 does not extend parallel to the primary axis 13. That is, if the interface 78 extended parallel to the primary axis 13, the interface 78 would have a minimal surface area thereby reducing the surface available to create a seal. As such, the split seal body first end 74 and second end 76, are cut, or otherwise separated, at an angle relative to the primary axis 13. In this configuration, the interface 78 has a larger surface area, relative to a cut that extends parallel to the primary axis 13, which enhances the sealing ability of the interface 78.

As shown in FIGS. 8A-8B, preferably, the at least one seal pack 32 includes a plurality of split seals 70. The split seals 70 are disposed adjacent to each other between the split male energizer 80 and the split female energizer 82. To reduce the chance of a leak through multiple split seals 70, the split seals 70 are configured so that the interface 78 between adjacent split seals 70, or between a split seal 70 and an adjacent split male energizer 80 or split female energizer 82, are not aligned. More preferably, each seal interface 78 is disposed generally opposite across the primary axis 13 from the seal interface 78 on an immediately adjacent split seal 70. Preferably, and as shown in FIGS. 11-12, each split seal body 72 has a V-shaped cross-section defining a groove 90 on a first axial face 92 and a vertex 94 on the opposing, second axial face 96.

Figure 15:
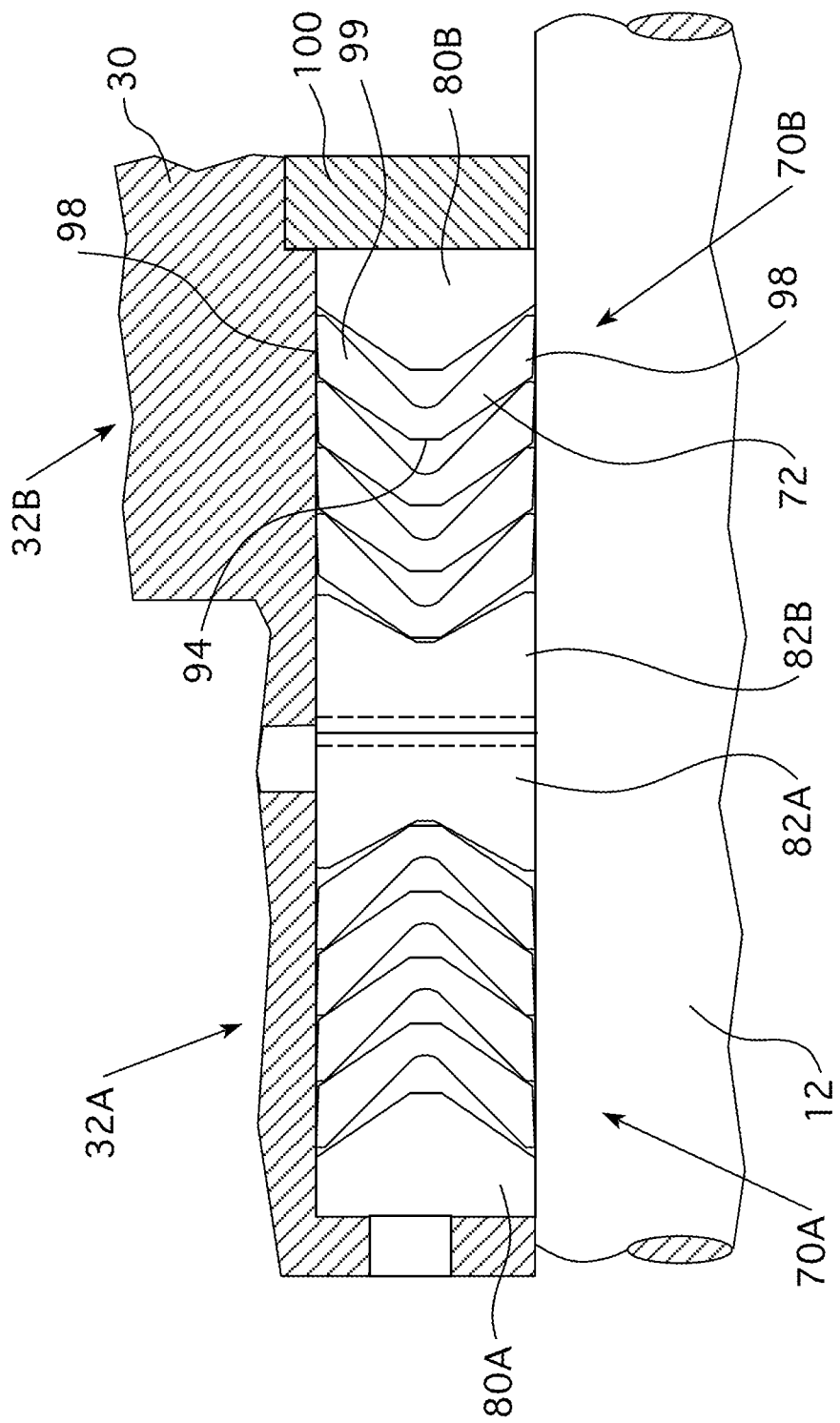
FIG. 15 is a cross-sectional view of the seal packs wherein the seals have an alternate cross-section.

As shown in the figures, the seal vertex 94 may be truncated, i.e. flattened. Further, with a V-shaped cross-section, the split seal body 72 has two tips 98 distal to the vertex 94. It is noted that, as shown in FIGS. 11-12, the split seal body 72 has a generally consistent thickness, when viewed in cross-section, between the vertex 94 and the two tips 98. As detailed below, and as shown in FIGS. 5 and 15, the split seal body 72 may be tapered so that, when viewed in cross-section, the body becomes thicker between the vertex 94 and the two tips 98. The split seals 70 are oriented in a nested manner, as shown in FIG. 8A. That is, the first axial face 92 of one split seal 70 is disposed adjacent to the second axial face 96 of an adjacent split seal 70. Thus, with split seals 70 having a V-shaped cross-section, the vertex 94 of one split seal 70 is disposed in the groove 90 of the immediately adjacent split seal 70.

The split male energizer 80 and the split female energizer 82, shown in FIGS. 13-14 and 9-10 respectively, are structured to engage and compress the plurality of split seals 70. The split male energizer 80 and the split female energizer 82 each have an inner axial face 81, 83, respectively, and an outer axial face 85, 87, respectively. It is noted that, for the energizers 80, 82, "inner face" and "outer face" are used to describe the orientation of the energizer 80, 82 relative to the associated seal pack 32, and not relative to the final orientation within the seal assembly 16. Each split male energizer and split female energizer outer axial face 85, 87 is generally flat. It is preferable that the split male energizer 80 and the split female energizer 82 be structured to nest with the adjacent split seal(s) 70. Thus, where the split seals 70 have a V-shaped cross-section, the split male energizer inner axial face 81 includes a V-shaped protrusion 84 sized to correspond to the split seal groove 90. Similarly, the split female energizer inner axial face 83 has a V-shaped groove 86 sized to correspond to the split seal vertex 94. Thus, the split male energizer 80 and the split female energizer 82 are structured to nest with an immediately adjacent split seal 70. It is noted that, as the compression from the split male energizer 80 and the split female energizer 82 acts in an axial direction, the plurality of split seals 70 expand radially causing the plurality of split seals 70 to sealingly engage the ram 12.

The at least one seal pack 32 preferably includes two seal packs 32A, 32B, as shown in FIGS. 6, 7, and 8B. As used hereinafter, the letters "A" and "B" are used to differentiate between similar elements of the different seal packs 32A, 32B. For example, seal pack 32A has a male energizer 80A whereas seal pack 32B has a male energizer 80B. The seal packs 32A, 32B are, preferably, immediately adjacent each other and contact each other. More preferably, two energizers 80A, 80B, 82A, 82B of the same "gender" are disposed immediately adjacent to each other. That is, in a pair seal packs 32A, 32B having split seals 70A, 70B with a V-shaped cross-section, the two energizers 80A, 80B or 82A, 82B of the same "gender" are disposed immediately adjacent to each other. This configuration means that the seals 70A, 70B of the different seal packs 32A, 32B face opposite directions, as best shown in FIG. 5. That is, the split seal vertices 94A, 94B in the first and second seal packs 32A, 32B are oriented, i.e. "point," in opposite directions.

As shown in FIGS. 5-7, the retaining device 36 is structured to maintain the at least one seal pack 32 in place in a compressed state and, is more preferably structured to adjustably compress the at least one seal pack 32. In an embodiment wherein the ram 12 has a non-circular cross-section (not shown) the retaining device 36 may use a lever/cam assembly (not shown) to compress the at least one seal pack 32. In the more typical instance wherein the ram 12 has a generally circular cross-section, the retaining device 36 is preferably a retaining ring 100. The retaining ring 100 has a threaded coupling device 102 (FIG. 5) on the outer radial surface. Further, in this embodiment, the seal assembly housing body 34 has a threaded coupling device 104 (FIGS. 5 and 6) structured to engage the retaining ring threaded coupling device 102. That is, the seal assembly housing inner surface 40 has a set of threads, i.e. the threaded coupling device 104, structured to engage the retaining ring threaded coupling device 102. The seal assembly housing threaded coupling device 104 is disposed adjacent the seal assembly body flange 52 and which is spaced from the seal support flange 62. Thus, the retaining ring 100 may be adjustably coupled to the seal assembly housing body 34 and is structured to move along the primary axis 13.

Further, the retaining ring 100 has an outer axial face 106 and an inner axial face 108 (FIG. 5). The retaining ring inner axial face 108 is structured to be disposed adjacent to, and preferably in contact with the at least one seal pack 32. The retaining ring outer axial face 106 has at least one radial recess 110 thereon, and preferably a plurality of radial recesses 110. The at least one radial recess 110 is one component of a locking device 120. That is, the retaining device 36 includes a locking device 120 structured to prevent movement of the retaining device 36 while the locking device 120 is engaged. When the retaining device 36 is a locking ring 100, the locking device 120 is structured to prevent rotation of the locking ring 100. The locking device 120, preferably, has a first component 122 and a second component 124. For example, in one embodiment the locking device first component (not shown) 122 could be a rod or dowel slidably mounted on the seal assembly housing body 34 and structured to slide radially relative to the primary axis 13. The corresponding locking device second component (not shown) 124 could be one or more radial bore holes on the retaining ring 100. In this configuration, the sliding rod is structured to fit within the bore hole. When a rod is within a bore hole, the retaining ring 100 is prevented from rotating.

In the preferred embodiment, the locking device first and second components 120, 122 are a movable clip 112 and the at least one radial recess 110 noted above. The clip 112 is disposed on the seal assembly housing body 34 and is structured to move between a first position wherein the clip 112 does not engage a radial recess 110, and a second position wherein the clip 112 engages a radial recess 110. The clip 112 may be coupled to the seal assembly housing body 34 by a removable fastener 114.

The seal assembly 16 is assembled as follows. Initially, the two seal packs 32A, 32B are disposed in the seal assembly body inner surface radial recess 60. One seal pack 32A, the seal pack 32A to the left as shown in FIG. 5, abuts the seal support flange 62. The second seal pack 32B abuts the first seal pack 32A with the two female energizer outer axial faces 87A, 87B contacting each other. Thus, the second seal pack male energizer outer axial face 85B is disposed at the open axial face of the recess 60 adjacent to the seal assembly housing flange 52. The retaining ring 100 is threadably coupled to the seal assembly body 34 by the retaining ring threaded coupling device 102 engaging the seal assembly housing threaded coupling device 104. As the retaining ring 100 move axially toward the seal support flange 62, the retaining ring inner axial face 108 engages the second seal pack 32B, and more specifically, the split male energizer outer axial face 85B. Continued rotation of the retaining ring 100 causes the seal packs 32A, 32B to compress and seal against the ram 12 as described above. Once the seal packs 32A, 32B effectively engage, i.e. sealingly engage, the ram 12, the locking device 120 is engaged to prevent rotation of the retaining ring 100.

During the initial installation of the seal assembly 16, the ram 12 must be absent from the ram assembly housing passage 20. The seal assembly body 34 is coupled to the ram assembly housing 14. As noted above, the seal assembly housing narrow portion 50 is sized to fit within the ram assembly housing passage entrance 22. The O-rings 58 on the seal assembly body outer surface 42 at the body narrow portion 50 sealingly engage the inner surface of the ram assembly housing passage 20. Further, the seal assembly body flange 52 engages the ram assembly housing axial face 15 and elongated fasteners extending parallel to the primary axis 13 are passed through the seal assembly body flange 52 into the ram assembly housing axial face 15 thereby coupling the seal assembly 16 to the ram assembly housing 14. The ram 12 is then moved through the generally contiguous the seal assembly passage 38 and the ram assembly housing passage 20.

Over time the ram 12 repeatedly moves between a first and second position as discussed above. This motion causes the seal packs 32A, 32B to wear. That is, the split seals 70 engage the ram 12 less effectively. Prior to replacing the split seals 70, the split seals 70 may be made more effective by further compressing the seal packs 32A, 32B. That is, the locking device 120 is disengaged and retaining ring 100 is moved toward the seal support flange 62. This additional bias causes the split seals 70 to expand radially, as described above, and thereby engage the ram 12 more effectively. In other words, causing the retaining ring 100 to move longitudinally over the primary axis 13 causes the compression on the at least one seal pack 32 at least one seal 70 to be adjusted.

Eventually, however, one or more split seals 70 will need replaced. Unlike the prior art, which required removal of the ram 12 from the ram assembly housing passage 20, the split seals 70 may be replaced with the ram 12 disposed in the ram assembly housing passage 20. That is, the locking device 120 is disengaged and the retaining ring 100 is moved away from the seal support flange 62 until the retaining ring 100 is no longer coupled to the seal assembly housing body 34. The retaining ring 100 may be moved down the ram 12 until it is out of the way. The seal packs 32A, 32B are moved out of the seal assembly housing body 34 by sliding the seal packs 32A, 32B over the ram 12. Once out of the seal assembly housing body 34 the seal pack elements, i.e. each split seal 70, split male energizer 80 and split female energizer 82, are separated at their respective interfaces 78, 79 creating a gap and thereby allowing the split seal body 72, or energizer body 73, to be removed from about the ram 12.

Installation of new seal packs 32A, 32B is, essentially, the reverse of the removal procedure. That is, each split seal 70, and split energizer 80, 82, is separated at their respective interfaces 78, 79 creating a gap and thereby allowing the split seal body 72, or energizer body 73, to encircle the ram 12. Each split seal 70, and split energizer 80, 82, is positioned about the ram 12 and each interface 78, 79 is closed. That is, the split seal body first end 74 and second end 76, and/or the energizer body first and second ends 75, 77 are brought into alignment, and/or sealing engagement with each other. It is noted the split seal body first end 74 and second end 76, and/or the energizer body first and second ends 75, 77 may not sealingly engage each other until the seal packs 32A, 32B are compressed. Thus, the split seal body first end 74 and second end 76, and/or the energizer body first and second ends 75, 77 may be merely aligned at this time.

The split seals 70A, 70B are disposed between the respective male and female energizers 80A, 80B, 82A, 82B and configured in a nested manner. The seal packs 32A, 32B are moved axially over the ram 12 into the seal assembly housing body 34. The retaining ring 100 is moved into engagement with the seal assembly housing body 34 and coupled by the threaded coupling device 102, 104 thereto. The retaining ring 100 is then rotated, and thereby moved axially over the primary axis 13, until the seal packs 32A, 32B are compressed and the split seals 70 sealingly engage the ram 12. Further, the compression acting on the split seals 70, as well as on the energizers 80, 82, ensure that each interface 78, 79 is closed; that is, the seal body first and second ends 74, 76, and/or the energizer body first and second ends 75, 77, sealingly engage each other.

As shown in FIGS. 5 and 15, the split seals 70 may have an alternate cross-sectional shape. As shown in a cross-sectional view, the portions of the split seal body 72 between the vertex 94 and the two tips 98 as shown in FIG. 12 have a substantially consistent thickness. That is, the "legs" 99 of the V-shaped split seal body 72 have a generally consistent thickness. As shown best in FIG. 15, however, the split seal 70 may have an alternate shape wherein the "legs" of the V-shaped split seal body 72 increase in thickness between the vertex 94 and the two tips 98. That is the legs 99 of the V-shaped split seal body 72, when viewed as a cross-section, are thinner adjacent to the vertex 94 and thicker at the tips 98.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A seal assembly for a ram assembly, said ram assembly having a housing defining a passage and an elongated ram extending through, and longitudinally movable within, said ram housing passage, said ram longitudinal axis defining a primary axis, said ram having a circular cross-section, said seal assembly comprising:
    a seal assembly housing, said seal assembly housing having a body and a retaining device;
    said seal assembly housing body defining a passage and having an inner surface, and an outer surface;
    said seal assembly housing coupled to said ram assembly housing at said passage whereby said seal assembly housing passage and said ram assembly housing passage are generally contiguous;
    said retaining device structured to engage said seal assembly housing and to move longitudinally along said primary axis;
    said seal assembly housing and said retaining device extending about said ram;
    at least one seal pack, said at least one seal pack having at least one split seal, each said at least one split seal shaped to correspond to the cross-sectional shape of said ram; and
    wherein said retaining device includes a locking device structured to prevent movement of said retaining device while said locking device is engaged.

2. The seal assembly of claim 1 wherein:
    said at least one split seal disposed about said ram and between said retaining device and said seal assembly housing; and
    said retaining device is structured to compress said at least one seal.

3. The seal assembly of claim 1 wherein:
    said at least one split seal disposed about said ram and between said retaining device and said seal assembly housing; and
    said retaining device is structured to adjustably compress said at least one seal.

4. The seal assembly of claim 3 wherein said ram has a circular cross-section and wherein:
    said seal assembly housing body defines a substantially circular passage;
    said seal assembly housing having a threaded coupling device structured to engage said retaining device;
    said retaining device being a retaining ring, said retaining ring having a threaded coupling device structured to engage said seal assembly housing threaded coupling device;
    whereby, when said retaining ring threadably engages said seal assembly housing threaded coupling device, rotating said retaining ring causes said retaining ring to move longitudinally over said primary axis; and
    whereby the compression on said at least one seal is adjusted.

5. A seal assembly for a ram assembly, said ram assembly having a housing defining a passage and an elongated ram extending through, and longitudinally movable within, said ram housing passage, said ram longitudinal axis defining a primary axis, said seal assembly comprising:
    a seal assembly housing, said seal assembly housing having a body and a retaining device;
    said seal assembly housing body defining a passage and having an inner surface, and an outer surface;
    said seal assembly housing coupled to said ram assembly housing at said passage whereby said seal assembly housing passage and said ram assembly housing passage are generally contiguous;
    said retaining device structured to engage said seal assembly housing and to move longitudinally along said primary axis;
    said seal assembly housing and said retaining device extending about said ram;
    at least one seal pack, said at least one seal pack having at least one split seal, each said at least one split seal shaped to correspond to the cross-sectional shape of said ram;
    said at least one seal pack includes a male energizer and a female energizer;
    said male energizer and said female energizer shaped to correspond to the cross-sectional shape of said ram;
    wherein at least one of said male energizer or said female energizer is a split energizer; and
    said plurality of split seals disposed between said male energizer and said female energizer.

6. The seal assembly of claim 5 wherein said at least one split seal has a body with a first end and a second end, wherein said body forms a loop and said seal body first end and said seal body second end sealingly engage each other at an interface.

7. The seal assembly of claim 6 wherein said at least one seal pack includes a plurality of split seals, said split seals disposed adjacent to each other.

8. The seal assembly of claim 7 wherein each said seal interface is disposed generally opposite across said primary axis from the seal interface on an immediately adjacent seal.

9. The seal assembly of claim 5 wherein:
- each said split seal has a V-shaped cross-section defining a groove on a first axial face and a vertex on the opposing, second axial face;
- each said split seal in said at least one seal pack being oriented in the same direction;
- said male energizer has generally flat outer axial face and an inner face having a V-shaped protrusion;
- said female energizer has a generally flat outer axial face and an inner face having a V-shaped groove; and
- wherein said plurality of split seals disposed between said male energizer and said female energizer with said male energizer inner face V-shaped protrusion extending into the adjacent split seal first face axial groove and with said female energizer V-shaped groove having the second axial face vertex of the adjacent split seal disposed therein.

10. A seal assembly for a ram assembly, said ram assembly having a housing defining a passage and an elongated ram extending through, and longitudinally movable within, said ram housing passage, said ram longitudinal axis defining a primary axis, said seal assembly comprising:
- a seal assembly housing, said seal assembly housing having a body and a retaining device;
- said seal assembly housing body defining a passage and having an inner surface, and an outer surface;
- said seal assembly housing coupled to said ram assembly housing at said passage whereby said seal assembly housing passage and said ram assembly housing passage are generally contiguous;
- said retaining device structured to engage said seal assembly housing and to move longitudinally along said primary axis;
- said seal assembly housing and said retaining device extending about said ram;
- at least one seal pack, said at least one seal pack having a plurality of split seals, said split seals disposed adjacent to each other;
- wherein each said split seal is shaped to correspond to the cross-sectional shape of said ram; and
- wherein said retaining device includes a locking device structured to prevent movement of said retaining device while said locking device is engaged.

11. The seal assembly of claim 10 wherein:
- each said split seal disposed about said ram and between said retaining device and said seal assembly housing; and
- said retaining device is structured to compress said plurality of split seals.

12. The seal assembly of claim 10 wherein:
- each said split seal disposed about said ram and between said retaining device and said seal assembly housing; and
- said retaining device is structured to adjustably compress said plurality of split seals.

13. The seal assembly of claim 12 wherein said ram has a circular cross-section and wherein:
- said seal assembly housing body defines a substantially circular passage;
- said seal assembly housing having a threaded coupling device structured to engage said retaining device;
- said retaining device being a retaining ring, said retaining ring having a threaded coupling device structured to engage said seal assembly housing threaded coupling device;
- whereby, when said retaining ring threadably engages said seal assembly housing threaded coupling device, rotating said retaining ring causes said retaining ring to move longitudinally over said primary axis; and
- whereby the compression on each split seal is adjusted.

14. A seal assembly for a ram assembly, said ram assembly having a housing defining a passage and an elongated ram extending through, and longitudinally movable within, said ram housing passage, said ram longitudinal axis defining a primary axis, said seal assembly comprising:
- a seal assembly housing, said seal assembly housing having a body and a retaining device;
- said seal assembly housing body defining a passage and having an inner surface, and an outer surface;
- said seal assembly housing coupled to said ram assembly housing at said passage whereby said seal assembly housing passage and said ram assembly housing passage are generally contiguous;
- said retaining device structured to engage said seal assembly housing and to move longitudinally along said primary axis;
- said seal assembly housing and said retaining device extending about said ram;
- at least one seal pack, said at least one seal pack having a plurality of split seals, said split seals disposed adjacent to each other;
- wherein each said split seal is shaped to correspond to the cross-sectional shape of said ram;
- wherein said retaining device includes a locking device structured to prevent movement of said retaining device while said locking device is engaged;
- said locking device includes a first component and a second component, said locking device first component structured to move between two positions, a first position wherein said locking device first component does not engage said locking device second component, and a second position wherein said locking device first component engages said locking device second component;
- said locking device first component disposed on said seal assembly housing body; and
- said locking device second component disposed on said retaining device.

15. A seal assembly for a ram assembly, said ram assembly having a housing defining a passage and an elongated ram extending through, and longitudinally movable within, said ram housing passage, said ram longitudinal axis defining a primary axis, wherein said ram has a circular cross-section, said seal assembly comprising:
- a seal assembly housing, said seal assembly housing having a body and a retaining device;
- said seal assembly housing body defining a passage and having an inner surface, and an outer surface;
- said seal assembly housing coupled to said ram assembly housing at said passage whereby said seal assembly housing passage and said ram assembly housing passage are generally contiguous;
- said retaining device structured to engage said seal assembly housing and to move longitudinally along said primary axis;
- said seal assembly housing and said retaining device extending about said ram;
- at least one seal pack, said at least one seal pack having a plurality of split seals, said split seals disposed adjacent to each other;
- wherein each said split seal is shaped to correspond to the cross-sectional shape of said ram;
- each said split seal disposed about said ram and between said retaining device and said seal assembly housing;

said retaining device is structure to adjustably compress said plurality of split seals;

said seal assembly housing body defines a substantially circular passage;

said seal assembly housing having a threaded coupling device structured to engage said retaining device;

said retaining device being a retaining ring, said retaining ring having a threaded coupling device structured to engage said seal assembly housing threaded coupling device;

whereby, when said retaining ring threadably engages said seal assembly housing threaded coupling device, rotating said retaining ring causes said retaining ring to move longitudinally over said primary axis;

whereby the compression on each split seal is adjusted;

wherein said retaining device includes a locking device structured to prevent movement of said retaining device while said locking device is engaged;

said locking device includes a first component and a second component, said locking device first component structured to move between two positions, a first position wherein said locking device first component does not engage said locking device second component, and a second position wherein said locking device first component engages said locking device second component;

said locking device first component disposed on said seal assembly housing body;

said locking device second component disposed on said retaining device;

said retaining ring has an outer axial face, said retaining ring axial face having at least one radial recess thereon, said radial recess being said locking device second component; and said locking device first component being a movable clip, said clip structured to move between a first position wherein said clip does not engage said at least one radial recess, and a second position wherein said clip engages said at least one radial recess.

16. The seal assembly of claim 15 wherein:

said at least one seal pack includes a male energizer and a female energizer;

said male energizer and said female energizer shaped to correspond to the cross-sectional shape of said ram, said male energizer and said female energizer each having a split seal; and said plurality of split seals disposed between said male energizer and said female energizer.

17. The seal assembly of claim 16 wherein:

each said split seal has a V-shaped cross-section defining a groove on a first axial face and a vertex on the opposing, second axial face;

each said split seal in said at least one seal pack being oriented in the same direction;

said male energizer has generally flat outer axial face and an inner face having a V-shaped protrusion;

said female energizer has a generally flat outer axial face and an inner face having a V-shaped groove; and wherein said plurality of split seals disposed between said male energizer and said female energizer with said male energizer inner face V-shaped protrusion extending into the adjacent split seal first face axial groove and with said female energizer V-shaped groove having the second axial face vertex of the adjacent split seal disposed therein.

18. The seal assembly of claim 17 wherein:

said at least one seal pack includes a first seal pack and a second seal pack; and wherein the split seal vertices in said first and second seal pack are oriented in opposite directions.

\* \* \* \* \*